No. 637,498. Patented Nov. 21, 1899.
F. BURGER.
AUTOMATIC HORIZONTALING DEVICE FOR CAR BODIES.
(Application filed Feb. 25, 1899.)

(No Model.) 2 Sheets—Sheet 1.

No. 637,498. Patented Nov. 21, 1899.
F. BURGER.
AUTOMATIC HORIZONTALING DEVICE FOR CAR BODIES.
(Application filed Feb. 25, 1899.)
(No Model.) 2 Sheets—Sheet 2.
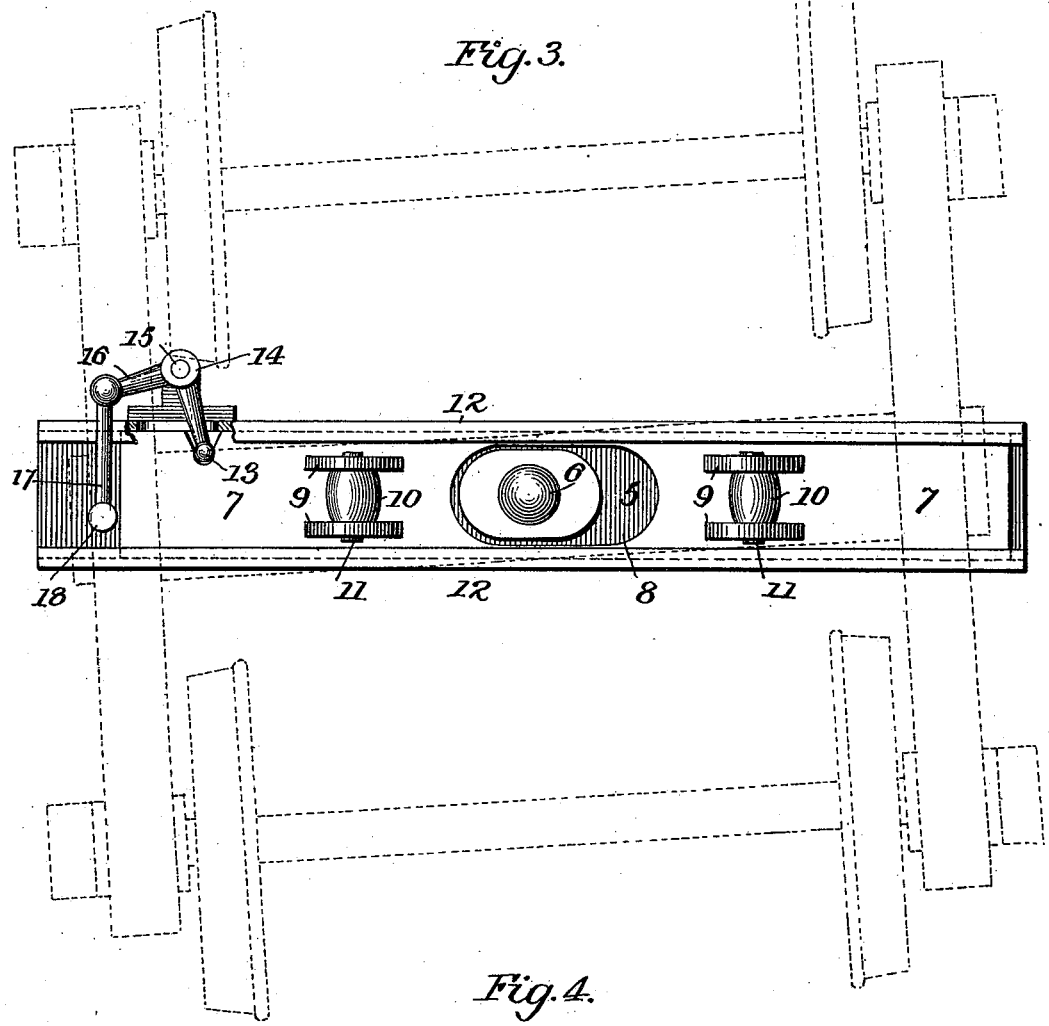
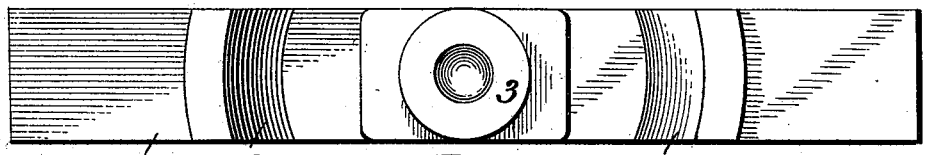
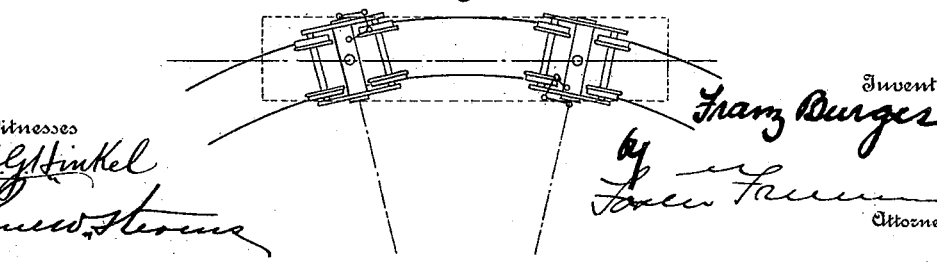

United States Patent Office.

FRANZ BURGER, OF FORT WAYNE, INDIANA, ASSIGNOR OF THREE-FOURTHS TO HENRY M. WILLIAMS, OF SAME PLACE.

AUTOMATIC HORIZONTALING DEVICE FOR CAR-BODIES.

SPECIFICATION forming part of Letters Patent No. 637,498, dated November 21, 1899.

Application filed February 25, 1899. Serial No. 706,868. (No model.)

*To all whom it may concern:*

Be it known that I, FRANZ BURGER, a citizen of the United States, residing at Fort Wayne, Allen county, State of Indiana, have invented certain new and useful Improvements in Automatic Horizontaling Devices for Car-Bodies, of which the following is a specification.

My invention relates to railway-cars and similar vehicles, and has for its object to provide means whereby the platform or car-body will remain in a substantially horizontal position regardless of the inclination or divergence of the truck with relation to the car-body; and to these ends my invention consists in a construction and arrangement of parts combined and operating substantially as hereinafter more particularly set forth.

Figure 1:
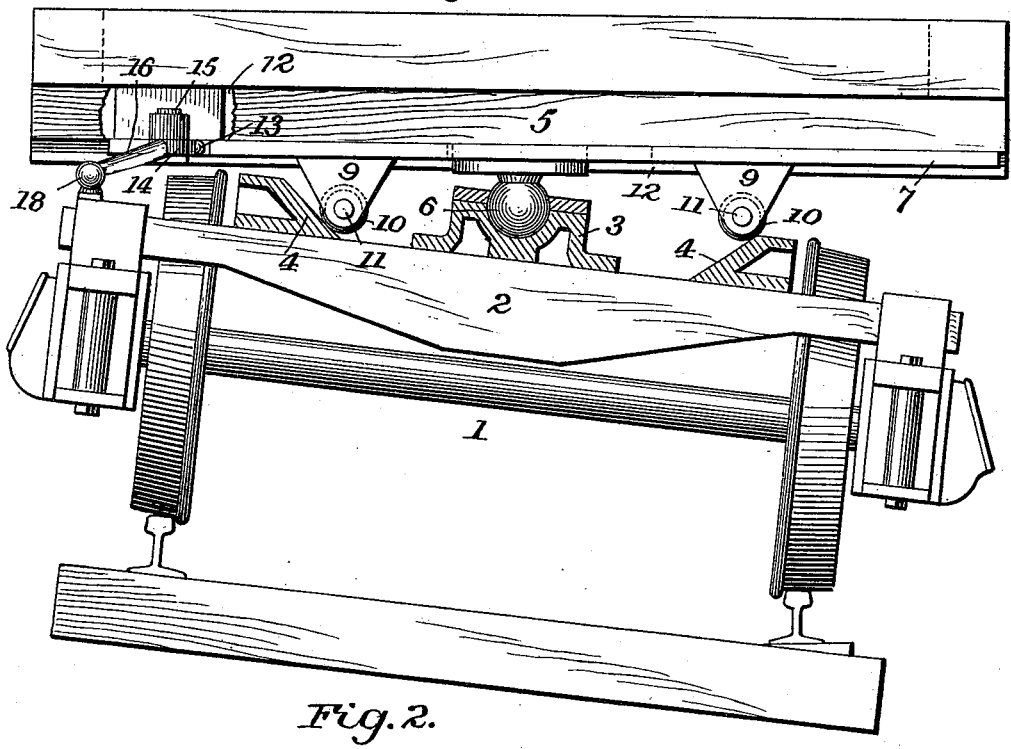
Figure 2:
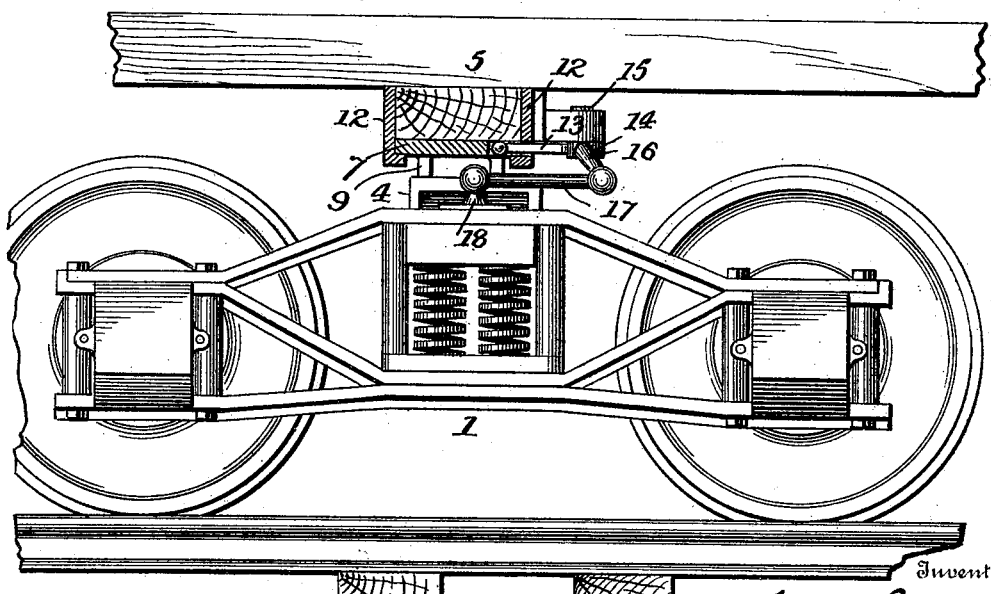

Referring to the accompanying drawings, wherein my invention is illustrated, Figure 1 is a transverse vertical section of a portion of a car and truck. Fig. 2 is a side view of the same, some parts being in section. Fig. 3 is a bottom plan view of the car-body, showing in dotted lines the truck and the means of connecting the two. Fig. 4 is a plan view of the truck-bolster; and Fig. 5 is a diagram showing, on a somewhat-exaggerated scale, the relative positions of the car body and trucks on a curved track.

As above indicated, the object of my invention is to provide means whereby the car-body shall be preserved in a substantially horizontal position under all conditions, and more especially where the car is passing a curve, under which conditions it is usual to raise one of the rails of the track, so that the truck is more or less out of a horizontal position and the car-body is likely to sway backward and forward, producing unpleasant sensations and being more or less destructive in its results.

In moving on a straight and level track the car-body and its truck or trucks preserve a normal relation to each other and the axes of the axles or wheels are normally at right angles to the longitudinal axis or vertical plane of the car. When, however, the car passes around a curve, the axes of the axles or wheels are inclined with relation to the longitudinal axis or vertical plane of the car at an angle varying from that of a right angle, or, described in other language, the longitudinal axis of the truck diverges from the longitudinal axis of the car to a greater or less extent, depending upon the radius of the curve. Further, in the construction of railways it is common to elevate the outer rail of the track above the level of the inner rail of the track, and this elevation varies more or less with relation to radius of the curve. It follows that when a car passes around a curve the axles of the truck are inclined more or less from the horizontal and the car-body also becomes inclined more or less and is apt to sway back and forth under the influence of centrifugal force and other forces acting on the car. By my invention I so construct and arrange the connections between the car-body and the truck that this tendency is avoided, and as the axles of the truck become more or less inclined the car-body is automatically adjusted in accordance with such inclination, so as to remain practically horizontal under all conditions; and my invention involves, broadly, means or connections between the truck or trucks and the car-body whereby the car-body is preserved or maintained in a horizontal or level position regardless of the inclination of the truck, and, further, these means or connections are so adjusted that they automatically produce their functions in accordance with the divergence or inclination of the car-truck from the longitudinal axis or vertical plane of the car-body.

With this general statement of my invention I will refer to the drawings as illustrating one means of accomplishing this result.

In the drawings, 1 represents an ordinary car-truck, which may be of any desired construction and which is provided with a truck-bolster 2, to which the car-body is connected in any usual manner, and in the present instance 5 represents the car-body bolster, and the two bolsters are connected by some sort of a universal joint, permitting motion in all directions, and in the present instance I have shown a ball-socket 3, mounted on the truck-bolster, and a ball 6, connected to the car-body bolster and fitting the socket in the usual manner, and while this is a preferable form of universal joint any other joint which will accomplish the same results is within my invention.

Mounted on the truck-bolster, on either side thereof, are inclined segmental pieces 4, and also mounted on or connected to the car-body bolster are brackets or hangers 9, in the present instance provided with rollers 10, mounted on a pin or bearing 11, the rollers being arranged to bear upon the inclined segmental pieces 4 and to maintain the car-body horizontal.

It will be observed that if the truck and car-body maintained their normal relations to each other the car-body would remain horizontal as long as the truck was horizontal, but if for any reason the truck were inclined the car-body would be inclined also. To compensate for such relative inclination between the car-body and truck, I provide means for adjusting the hangers or brackets 9 transversely across the car-body, and in the present instance the hangers are shown as mounted upon a sliding plate 7, which is shown as provided with an opening 8, through which extends the ball 6, and this plate is held in relation to the car-body bolster 5 by suitable guide-plates 12. Some means must be provided whereby this plate may be moved laterally with relation to the car-body in accordance with the inclination of the car-truck, and while various means or connections may be used to accomplish this purpose I have shown a bell-crank lever 14, fulcrumed at 15 to the side of the car-body bolster 5 and having one arm engaging the sliding plate 7, as at 13, while the other arm 16 is connected by a suitable joint with a connecting-link 17, which in turn is connected to the truck-bolster 2, as by a suitable pillar or bearing 18. These connections of the link 17 should be universal connections, such as ball-and-socket joints or otherwise, so as to permit the proper movement with relation to each other. With this or some equivalent connection between the truck and car-body it will be seen that any divergence of the truck from the longitudinal line or plane of the car-body will produce a corresponding movement of the sliding plate 7 and will change the relations of the brackets or hangers thereon to the segmental pieces 4 on the truck-bolster, causing the rollers or equivalent devices on the brackets or hangers to ride up or down the inner inclined faces of these segmental pieces, and thereby maintain the car-body horizontal regardless of the divergence or inclination of the truck from the car-body. It is evident that as the plate 7 is moved one way or the other across the car-body one roller will descend the incline on one side of the truck-bolster and the other will ascend, and thus the rocking of the car-body will be prevented, and as this ascent and descent by means of the connections described or their equivalents is arranged to be relative to the inclination or divergence of the truck from the longitudinal axis or vertical plane of the car the car-body will remain horizontal under all these conditions.

By means of the universal connections between the truck-bolster and the sliding plate on the car-bolster any inclination on the line of the axis of the truck with relation to the car-body will also be compensated for or equalized.

In Fig. 5 I have illustrated diagrammatically a car passing a curve, in which the two trucks are each at an incline or diverge from the longitudinal axis of the car-body, and by means of this device the relations of the car-body to the truck are changed, one side of the car being lowered and the other elevated relatively, for as is well known the elevation of the outer rail of the track with relation to the inner rail is usually in direct relation to the radius of the curve.

Having thus described the general principles of my invention and illustrated one means of carrying it out, it will be understood that I am not limited to the precise construction and arrangement of parts shown, but that the general principles of my invention may be utilized by those skilled in the art by the employment of similar operating means producing similar results.

What I claim is—

1. The combination with a car body and truck, of inclined segmental pieces mounted on the truck, and brackets or hangers adjustably supported on the car-body and movable upon the inclined faces of the segmental pieces, substantially as and for the purpose set forth.

2. The combination with a truck and a car-body pivotally connected to the truck in its central vertical plane, of a pair of inclined segmental pieces mounted on the truck, one on each side of said pivotal connection, and brackets or hangers adjustably supported on the car-body and movable upon the inclined faces of the segmental pieces, one hanger moving up its incline when the other is moving down its incline, substantially as and for the purpose set forth.

3. The combination with a car body and truck, of inclined segmental pieces mounted on the truck, brackets or hangers adjustably supported on the car-body, and movable upon the inclined faces of the segmental pieces and means actuated by the movement between the car-body and the truck and connected to the brackets or hangers to positively move the latter upon the inclined faces of the segmental pieces, substantially as and for the purpose set forth.

4. The combination with a truck and a car-body pivotally connected to the truck in its central vertical plane, of a pair of inclined segmental pieces mounted on the truck one on each side of said pivotal connection, the inclined faces of said pieces opposing each other and each extending upwardly and outwardly toward the adjacent side of the car-body, brackets or hangers movably supported on the car-body and engaging the inclined faces of said segmental pieces, and means actuated by the movement between the car-body and the truck to move the hangers upon the inclined faces of the segmental pieces substantially as and for the purpose set forth.

5. The combination with a car body and truck, of segmental inclined pieces mounted on the truck, a slide carrying brackets engaging said segmental pieces, connections between the slide and the truck whereby the slide is moved laterally in accordance with the inclination of the truck to the car-body, substantially as described.

6. The combination with a car body and truck, of segmental pieces mounted on the truck, a slide mounted on the car-body and having brackets bearing on the segmental pieces, a bell-crank mounted on the car-body and engaging the slide, and connections between the bell-crank and the truck, substantially as described.

In testimony whereof I have signed my name to this specification in the presence of two subscribing witnesses.

FRANZ BURGER.

Witnesses:
GEO. K. TORRENCE,
DANIEL MCGINNIS.